Nov. 8, 1960 M. WENGRYN 2,959,744
SATURABLE OSCILLATOR FREQUENCY CONTROL
Filed Nov. 7, 1956 2 Sheets-Sheet 1

INVENTOR.
MICHAEL WENGRYN
BY Ostrolenk, Faber, Gerb & Soffen
ATTORNEYS

Nov. 8, 1960 M. WENGRYN 2,959,744

SATURABLE OSCILLATOR FREQUENCY CONTROL

Filed Nov. 7, 1956 2 Sheets-Sheet 2

INVENTOR.
MICHAEL WENGRYN

BY Ostrolenk, Faber
Gerb & Soffen
ATTORNEYS.

United States Patent Office 2,959,744

Patented Nov. 8, 1960

2,959,744

SATURABLE OSCILLATOR FREQUENCY CONTROL

Michael Wengryn, Bellerose, N.Y., assignor to Kollsman Instrument Corporation, Elmhurst, N.Y., a corporation of New York Filed Nov. 7, 1956, Ser. No. 620,976

9 Claims. (Cl. 331—113)

My invention relates to a device having an electrical frequency output which is a function of a mechanical position for use in computer systems requiring analogue to digital conversion, telemetering systems and many other types of systems requiring conversion from a mechanical position to an output frequency.

In the article entitled "A Switching Transistor D.-C. to A.-C. Converter Having an Output Frequency Proportional to the D.-C. Input Frequency" by G. H. Royer appearing in Transactions, American Institute of Electrical Engineers, No. 19, a transductor is controlled by a first and second transistor so that the tranductor frequency output is a function of the transistor input voltage.

More specifically, a first and second transductor windings are alternately energized from the first and second transistor collector circuits, respectively, the two transistors alternating out of phase with one another between cut-off and saturation conditions.

As will be set forth hereinafter, and as is shown in the article, the transductor output frequency is a function of the transistor input voltage whereby any desired output frequency may be achieved by appropriate adjustment of this voltage. More specifically, the output frequency is given by $$f=\frac{V_{in}}{4N_2\phi_m}$$

where $f$ is output frequency, $V_{in}$ is input voltage, $N_2$ is the number of turns on a transductor control winding, and $\phi_m$ is the maximum flux change of the transductor magnetic core.

However, I have found that I can vary the output frequency as a function of the maximum flux change of the transductor magnetic core. Thus, by varying the effective flux carrying area of the transductor by a mechanical motion, a functionally related frequency output may be produced.

In a preferred embodiment of my invention, a D.-C. magnetic structure may be adjustably moved into saturating relationship with respect to a portion of the transductor magnetic core by the mechanical motion which is to be related to an output frequency.

When the controlling magnetic structure is in a first relationship with respect to the transductor magnetic core, the core will be capable of a first maximum flux change which determines a first frequency output. When the controlling magnetic srtucture is then moved to a new physical relationship (or the control magnetic structure is energized in a different manner), then the effective core area capable of flux change is varied to vary the maximum flux change possible whereby a new output frequency is achieved.

If desired, the control magnetic structure could be shaped to achieve any desired functional relation between the operating mechanical motion and the output frequency by controlling the relation between change in area of the control core (by saturation) and the mechanical motion during the control magnetic structure.

Accordingly, a primary object of my invention is to provide a novel device for producing a frequency output by controlling the effective maximum flux change of a magnetic core.

Another object of this invention is to provide a novel device for functionally relating a mechanical motion and a frequency output.

A still further object of this invention is to control the output frequency of a D.-C. to A.-C. converter using switching transistors wherein the maximum flux change of the transductor core controlled by the transistors is controlled by a mechanical motion.

Another object of my invention is to provide a control magnetic structure which is movable with respect to a magnetic core for controllably saturating portions of the core area and thereby controlling the maximum flux change of the core.

Another object of my invention is to control the maximum flux change of the transductor magnetic core used in a transistor controlled D.-C. to A.-C. converter by a movable control magnetic structure, the movement of said control magnetic structure being functionally related to the output frequency.

These and other objects of my invention will become apparent from the following description when taken in conjunction with the drawings in which.

Figure 1:
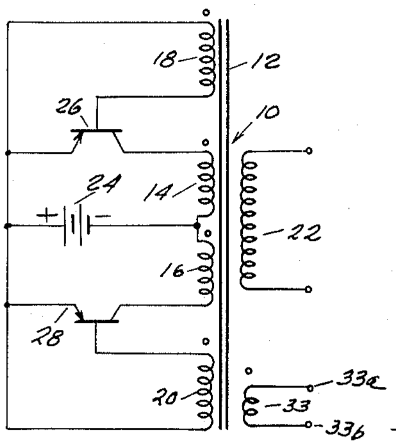
Figure 1 shows the type circuit to which my novel invention may be applied.

Referring first to Figure 1, the circuit shown therein shows the device of the above-mentioned article "A Switching Transistor D.-C. to A.-C. Converter Having an Output Frequency Proportional to the D.-C. Input Voltage."

While the above reference describes the device as operating with transistor controlled switching, it is to be understood that vacuum tube devices could be used wherein the emitter, base and collector connections could be replaced by the cathode, grid and plate connections of a vacuum tube. Thus, in the description set forth hereinafter, it is to be understood that the cathode, grid and plate of a vacuum tube are clear equivalents of the emitter, base and collector of the transistor.

Figure 2:
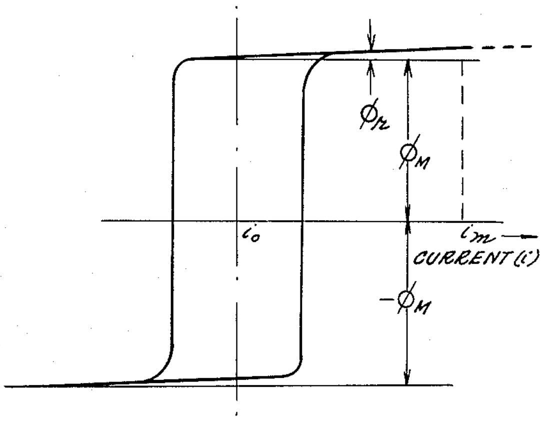
Figure 2 shows the flux current characteristic of the transductor of Figure 1.

In Figure 1, the transductor seen generally at 10 has a magnetic core 12 which is preferably of the square hysteresis loop type, this characteristic being shown in Figure 2.

Core 12 has a first and second main winding 14 and 16, respectively, a first and second control winding 18 and 20, respectively, and an output winding 22. The phasing of each of windings 14, 16, 18, 20 and 22 is indicated in the usual manner by a dot at the winding portions which assume the same phase.

An input voltage source 24 is alternately connected to windings 14 and 16, respectively, by the operation of switching transistors 26 and 28, respectively. Transistors 26 and 28, as described in the above-mentioned article, operate alternately with one another between cut-off and saturation current in the collector circuit and cycle core 12 between positive and negative saturation.

The operation of the circuit of Figure 1 proceeds as follows:

In order to initiate operation, an auxiliary winding 33 may have a starting pulse from any source applied across terminals 33*a* and 33*b*. It is assumed that this pulse will be positive at the top of winding 33 and is of sufficient voltage to induce a negative voltage at the bottom of winding 18 which is sufficient to make the base of transistor 26 negative with respect to its emitter.

It is to be noted, however, that a starting pulse may not be required since unbalance in the magnetic core or transistors will assure automatic starting.

By proper circuit design, transistor 26 can now carry a substantial saturation current in its collector circuit from voltage source 24 in series with winding 14. Note that transistor 28 is now "cut-off" since its base voltage is positive with respect to its emitter, thus blocking current flow through winding 16.

Once current flow is induced on the winding 14 (or winding 16), the circuit operation is self-sustaining as will be seen hereinafter.

With current flow through winding 14, the flux of core 12 begins to change in a positive direction and a voltage is induced in output winding 22 and control windings 18 and 20, this voltage being positive at the top of each winding. The induced voltage in winding 18 tends to maintain the base of transistor 26 negative with respect to its emitter and thereby keeps the transistor in a saturated or switched on position while the voltage induced in winding 20 tends to maintain its corresponding transistor 28 in a cut-off or switched off condition.

When the flux of core 12 reaches saturation at $\phi_m$ (Figure 2), the current in winding 14 rises sharply to a value determined by the base drive of transistor 26 while the induced voltage in each of the transductor windings disappears. Transistor 26, therefore, loses its biasing voltage of winding 18 and is placed in a cut-off condition to open the circuit to winding 14.

However, as the current through winding 14 decreases as seen in Figure 2 from $i_m$ to $i_o$ during collapse of the base drive of transistor 26, the flux of core 12 will fall back slightly to its retentivity value $\phi_r$ so that a voltage having a negative polarity at the top of each of the windings of Figure 1 will be induced by the flux change $(\phi_m-\phi_r)$.

This induced voltage then acts to make the base of transistor 28 negative with respect to its emitter to cause transistor 28 to assume a very small voltage drop whereby voltage source 25 is connected across winding 16. Hence, the flux of core 12 will now be changed in a negative direction toward $-\phi_m$ of Figure 2 whereby the output voltage of winding 22 will be negative at the top while winding 20 has a voltage thereon to maintain conduction of transistor 28 while the voltage of winding 18 maintains cut-off of transistor 26.

Clearly, this cyclic operation then proceeds to produce an alternating output voltage appearing on output winding 22.

As shown in the above-mentioned article, the frequency of the output voltage of winding 22 is given by $$f=\frac{V_{in}}{4N_2\phi_m}\text{ cycles of second}$$

where $V_{in}$ is the voltage of source 24, $N_2$ is the number of turns of each one of main windings 14 and 16, while $\phi_m$ is the maximum flux change of core 12.

I have found that the input frequency can be varied by varying the effective cross-sectional area of core 12 so that the output frequency may be functionally related to an input mechanical movement.

That is, since $$\phi_m=B_mA$$

where $B_m$ equals saturation of flux density which is constant for a particular material and A equals the effective cross-sectional area of the core.

Thus, the output frequency may be expressed as $$f=\frac{K}{A}$$

where $$K=\frac{V_{in}}{4N_2B_m}=\text{constant}$$

and the frequency output is inversely proportional to the effective cross-sectional core area.

Figure 3:
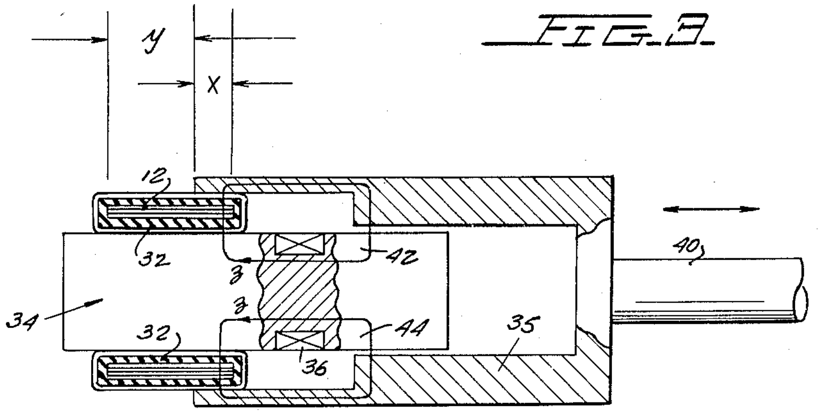
Figure 3 shows a cross-sectional view of the transductor core of Figure 1 when modified by a control magnetic structure in accordance with my invention.
Figures 4, 5:
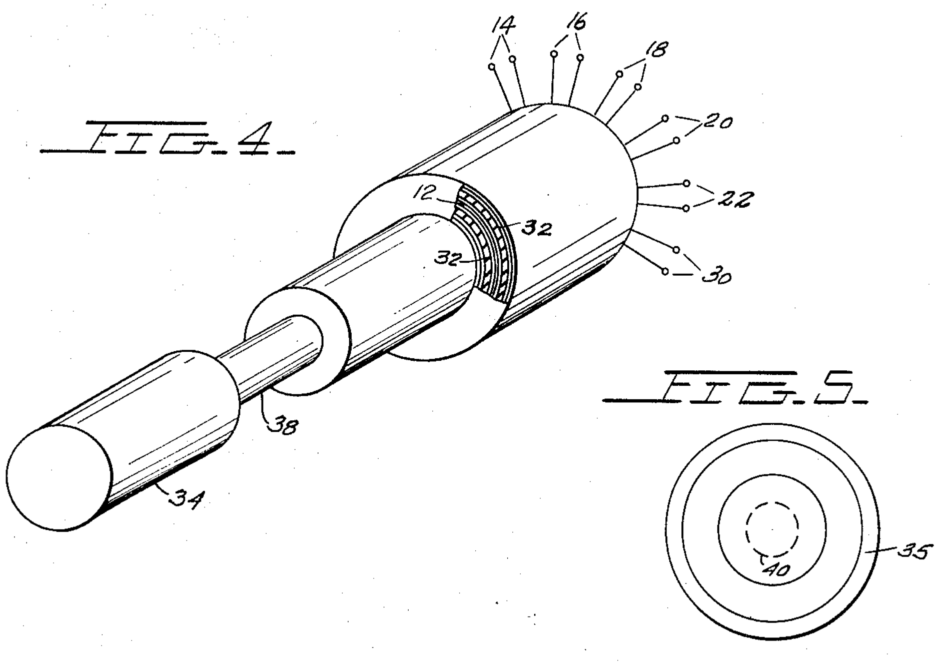
Figure 4 shows a perspective cross-sectional view of the fixed portion of the control structure of Figure 1 in conjunction with the transductor magnetic core.
Figure 5 shows a side view of the rotor portion of the movable portion of the control structure of Figure 1 when seen from the left-hand side.

One structure for obtaining the desired control of effective cross-sectional area of core 12 for control of output frequency as a function of a mechanical position is set forth in Figures 3, 4 and 5 wherein Figures 3 and 4 show the magnetic core 12 of Figure 1 as comprising a wound ribbon of the sharply saturating flux characteristic shown in Figure 2. The core 12 of Figures 3 and 4 is contained in an insulating housing 32 upon which the windings 14, 16, 18, 20, 22 and 30 of Figure 1 are wound as is indicated in Figure 4.

A control structure for controlling the effective cross-sectional area is thus seen as comprising the stationary portion 34 (Figures 3 and 4) and a movable portion 35 (Figures 3 and 5).

The stationary portion 34 is preferably comprised of a material of highly permeable magnetic material such as soft iron or a nickel iron alloy with a D.-C. magnetizing coil 36 (Figure 3) embedded in an annular groove 38 (Figure 4). The transductor structure including core 12 is then coaxially fastened in any desired manner to stationary portion 34.

The movable portion 35 as seen in Figures 3 and 5 is a hollow cylinder of highly permeable magnetic material and may be axially positioned with respect to core 12 by a shaft 40 attached at one end.

The movable portion 35 of the magnetic control structure completes a magnetic circuit which includes a portion of core 12 and the movable portion 34. This magnetic circuit is energized by winding 36 (or by an appropriate permanent magnet) to produce flux lines such as the flux lines 42 and 44 seen in Figure 3. By making the flux density of the flux lines of the control circuit strong enough, it is clear that the portions of core 12 lying in the control magnetic circuit can be saturated.

Thus, the effective cross-sectional area of core 12 may be reduced by the ratio $$\frac{y}{x+y}\cdot A$$

where dimensions $x$ and $y$ are shown in Figure 3 and A is the total cross-sectional area of the core.

C early, therefore, by constructing movable portions 35 to be axially movable as by a bearing support of any desired type between portions 34 and 35, the effectvie cross-sectional area of core 12 and thus the output frequency of winding 22 of Figure 1 will be functionally related to a mechanical actuation of shaft 40 which alters dimension $x$.

It is to be noted that the control flux source need not be a highly stable one since complete saturation of a predetermined core area is all that is required.

Figure 6:
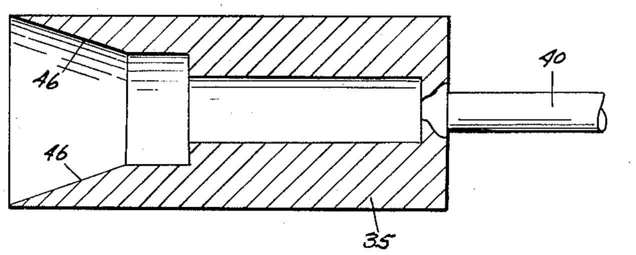
Figure 6 shows a second embodiment of a movable portion of the control structure wherein the surfaces are shaped to adjust the functional relation between mechanical movement and output frequency.
Figure 7:
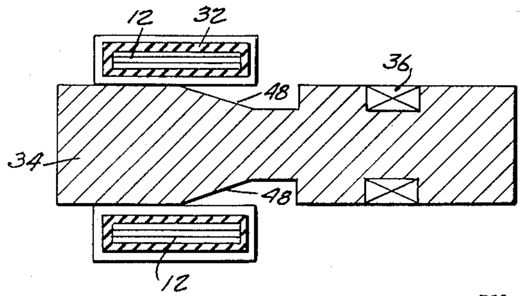
Figure 7 shows how the fixed portion of the control structure can be shaped to control the relationship between mechanical motion and output frequency.

If desired, the functional relation between output frequency and mechanical motion may be controlled by shaping surface 46 of movable portion 35 as seen in Figure 6 or by shaping a portion 48 of the stationary portion 34 as seen in Figure 7, or by using any desired combination of shaping of the stationary and movable portions 34 and 35, respectively.

In this mode of operation, partial saturation of the toroidal core will produce similar effects to a totally saturated section in that the integral of voltage the core can absorb is reduced by partial saturation just as effectively as it is reduced by total saturation of the core. However, partial saturation is more temperature sensitive than a fully saturated core section.

In the foregoing the invention has been described solely in connection with a specific illustrative embodiment thereof. Since many variations and modifications of the invention will now be obvious to those skilled in the art, I prefer to be bound not by the specific disclosure herein contained but only by the appended claims.

I claim:

1. A motion to frequency converter comprising a transductor and a switching means; said transductor comprising a magnetic core having a control winding and an output winding thereon; said switching means being connected to said control winding to alternately cycle the flux of said winding between positive and negative saturation, the output frequency of said output winding being a function of the maximum flux change of said magnetic core, and control means comprising a source of unidirectional magnetic flux; said control means being movably positionable with respect to said magnetic core for controllably saturating a portion of the cross-sectional area of said core in accordance with the positioning of said magnetic core.

2. A motion to frequency converter comprising a transductor and a switching means; said transductor comprising a magnetic core having a first and second control winding and an output winding thereon; said switching means including a first and second transistor type device having their collector circuits in series with a voltage source and said first and second control windings, respectively, to alternately cycle the flux of said winding between positive and negative saturation, the output frequency of said output winding being a function of the maximum flux change of said magnetic core, and control means comprising a source of unidirectional magnetic flux, said control means being movably positionable with respect to said magnetic core for controllably saturating a portion of the cross-sectional area of said core in accordance with the positioning of said magnetic core.

3. A motion to frequency converter comprising a transductor and a switching means; said transductor comprising a magnetic core having a control winding and an output winding thereon; said switching means being connected to said control winding to alternately cycle the flux of said winding between positive and negative saturation, the output frequency of said output winding being a function of the maximum flux change of said magnetic core, and control means comprising a source of unidirectional magnetic flux, said control means being positioned to include said magnetic core in a magnetic circuit; said control means being adjustable to controllably saturate portions of the cross-sectional area of said magnetic core.

4. A motion to frequency converter comprising a transductor and a switching means; said transductor comprising a magnetic core having a first and second control winding and an output winding thereon; said switching means including a first and second transistor type device having their collector circuits in series with a voltage source and said first and second control windings, respectively, to alternately cycle the flux of said winding between positive and negative saturation, the output frequency of said output winding being a function of the maximum flux change of said magnetic core, and control means comprising a source of unidirectional magnetic flux, said control means being positioned to include said magnetic core in a magnetic circuit; said control means being adjustable to controllably saturate portions of the cross-sectional area of said magnetic core.

5. A motion to frequency converter comprising a transductor and a switching means; said transductor comprising a magnetic core having a first and second control winding and an output winding thereon; said switching means including a first and second transistor type device having their collector circuits in series with a voltage source and said first and second control windings, respectively, to alternately cycle the flux of said winding between positive and negative saturation, the output frequency of said output winding being a function of the maximum flux change of said magnetic core, and control means comprising a source of unidirectional magnetic flux, said control means being positioned to include said magnetic core in a magnetic circuit; said control means being adjustable to controllably saturate portions of the cross-sectional area of said magnetic core, said magnetic circuit of said control means including a magnetic member adjacent said magnetic core for directing control flux to said core.

6. A motion to frequency converter comprising a transductor and a switching means; said transductor comprising a magnetic core having a first and second control winding and an output winding thereon; said switching means including a first and second transistor type device having their collector circuits in series with a voltage source and said first and second control windings, respectively, to alternately cycle the flux of said winding between positive and negative saturation, the output frequency of said output winding being a function of the maximum flux change of said magnetic core, and control means comprising a source of unidirectional magnetic flux, said control means being positioned to include said magnetic core in a magnetic circuit; said control means being adjustable to controllably saturate portions of the cross-sectional area of said magnetic core, said magnetic circuit of said control means including a magnetic member adjacent said magnetic core for directing control flux to said core, the surfaces of said magnetic member being shaped to control the functional relation between change in the effective cross-sectional area of said magnetic core and a movement of said control means with respect to said magnetic core.

7. A motion to frequency converter comprising a transductor and a switching means; said transductor comprising a magnetic core having a first and second control winding and an output winding thereon; said switching means including a first and second transistor type device having their collector circuits in series with a voltage source and said first and second control windings, respectively, to alternately cycle the flux of said winding between positive and negative saturation, the output frequency of said output winding being a function of the maximum flux change of said magnetic core, and control means comprising a source of unidirectional magnetic flux, said control means being positioned to include said magnetic core in a magnetic circuit; said control means being adjustable to controllably saturate portions of the cross-sectional area of said magnetic core, said magnetic circuit of said control means including a stationary portion having said transductor coaxially mounted thereon and extending through the center of said transductor and a movable portion, said movable portion being adjustably positioned with respect to said magnetic core for adjustably saturating portions of the cross-sectional area of said magnetic core.

8. A motion to frequency converter comprising a transductor and a switching means; said transductor comprising a magnetic core having a first and second control winding and an output winding thereon; said switching means including a first and second transistor type device having their collector circuits in series with a voltage source and said first and second control windings, respectively, to alternately cycle the flux of said winding between positive and negative saturation, the output frequency of said output winding being a function of the maximum flux change of said magnetic core, and control means comprising a source of unidirectional magnetic flux, said control means being positioned to include said magnetic core in a magnetic circuit; said control means being adjustable to controllably saturate portions of the cross-sectional area of said magnetic core, said magnetic circuit of said control means including a stationary portion having said transductor coaxially mounted and extending through the center of said transductor and a movable portion, said movable portion being adjustably positioned with respect to said magnetic core for adjustably saturating portions of the cross-sectional area of said magnetic core, one of said portions having its surface adjacent said magnetic core shaped.

9. A motion to frequency converter comprising a transductor and a switching means control therefor; said switching means control being connected to control windings of said transductor and cycling the magnetic flux of the magnetic core of said transductor; the output frequency of an output winding on said transductor being dependent upon the maximum flux change of said magnetic core; and control means for varying the effective cross-sectional area of said transductor core to thereby vary the maximum possible flux change of said magnetic core; said control means being positioned adjacent to said magnetic core; said control means being movable to a first position for decreasing the effective cross-sectional area of said magnetic core and to a second position for effecting an increase in the effective cross-sectional area of said magnetic core, said control means including a source of saturating unidirectional flux for adjustably saturating portions of said magnetic core.

References Cited in the file of this patent

UNITED STATES PATENTS

| | | |
|---|---|---|
| 2,111,373 | Schaper | Mar. 15, 1938 |
| 2,190,082 | Polydoroff | Feb. 13, 1940 |
| 2,525,438 | Wuerfel | Oct. 10, 1950 |
| 2,621,224 | Priest | Dec. 9, 1952 |
| 2,774,878 | Jensen | Dec. 18, 1956 |
| 2,783,380 | Bonn | Feb. 26, 1957 |